No. 848,368. PATENTED MAR. 26, 1907.
J. O. HOBBS.
TRANSMISSION MECHANISM.
APPLICATION FILED OCT. 25, 1905.
2 SHEETS—SHEET 1.
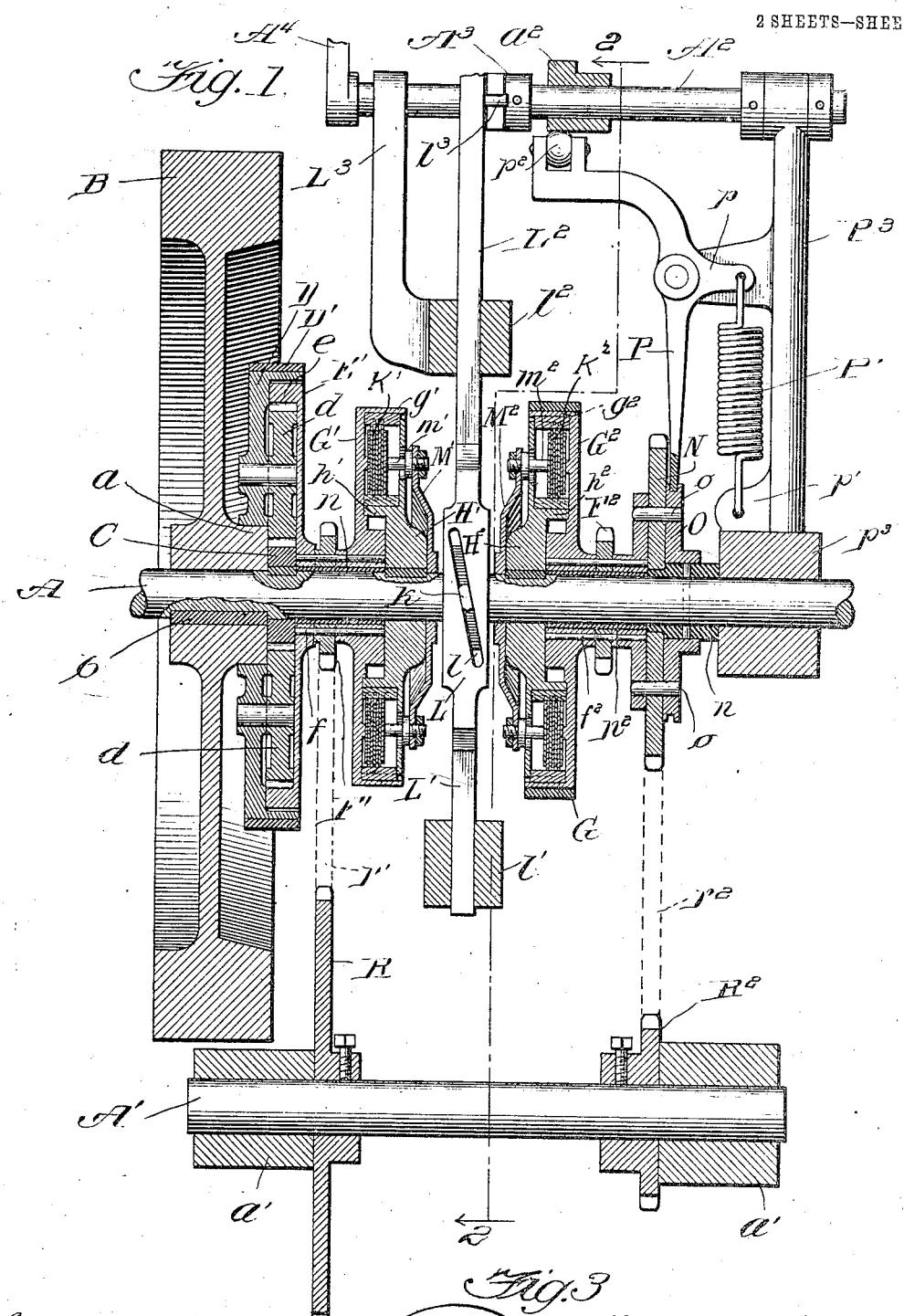
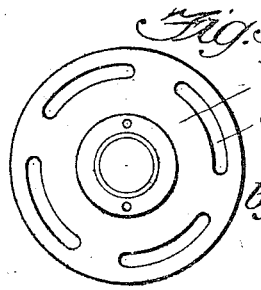
Witnesses:
H. S. Gaither
C. A. Mullen
Inventor:
John O. Hobbs
by Chamberlin & Wilkinson
Attys.

No. 848,368. PATENTED MAR. 26, 1907.
J. O. HOBBS.
TRANSMISSION MECHANISM.
APPLICATION FILED OCT. 25, 1905.
2 SHEETS—SHEET 2.
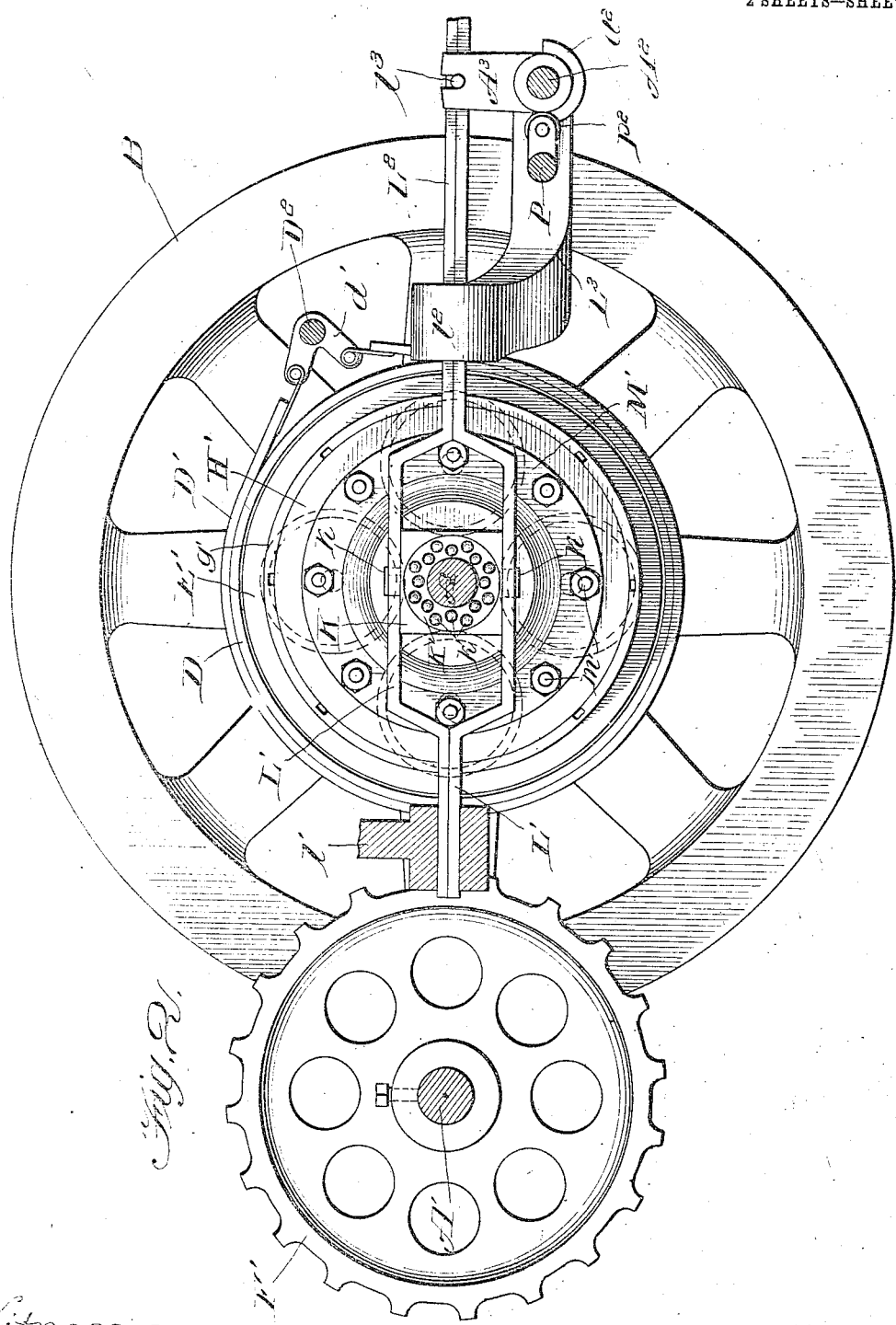
Witnesses:
Inventor:
John O. Hobbs
by Chamberlin & Wilkinson
Attys.

UNITED STATES PATENT OFFICE.

JOHN O. HOBBS, OF CHICAGO, ILLINOIS.

TRANSMISSION MECHANISM.

No. 848,368.   Specification of Letters Patent.   Patented March 26, 1907.

Application filed October 25, 1905. Serial No. 284,300.

*To all whom it may concern:*

Be it known that I, JOHN O. HOBBS, a citizen of the United States, residing at Chicago, county of Cook, State of Illinois, have invented a certain new and useful Improvement in Transmission Mechanism; and I declare the following to be a full, clear, and exact description of the same, such as will enable others skilled in the art to which it pertains to make and use the same, reference being had to the accompanying drawings, which form a part of this specification.

My invention relates in general to power-transmission mechanism, and more particularly to differential gearing interposed between a motor and a driven element, whereby the latter may be rotated at various speeds in one direction or in a reverse direction.

It is desirable, especially in automobiles, to so connect the motor with a driven element, which in turn is operatively connected to the rear axle of the automobile, that the speed and power transmitted from the motor may be varied at the will of the operator and that the direction of rotation of the driven element may be reversed while the motor continues to run in the same direction.

The primary object of my invention is to provide transmission mechanism for connecting a motor to a driven element which may be readily adjusted to vary the speed and power of rotation of the element or to reverse the direction of rotation thereof.

A further object of my invention is to provide a differential transmission mechanism which will be simple in construction, inexpensive in manufacture, and efficient in operation.

My invention, generally described, consists of a driving-shaft, a pinion fixed to the shaft, an internal gear-wheel loosely mounted on the shaft, a carrier loosely mounted on the shaft, gear-wheels journaled on said carrier in mesh with said pinion and with said internal gear, means for locking said carrier against rotation, a sprocket-wheel and clutch member rigidly connected to said internal gear, a coöperating clutch member fixed upon said shaft, a second pair of clutch members one of which is fixed upon the shaft and the other rotatively mounted thereon, a driving element and one member of a third clutch rigidly connected to the rotatable member of the second clutch, a countershaft having a relatively large sprocket-wheel fixed thereon connected by a sprocket-chain with said first sprocket-wheel, a relatively small sprocket-wheel fixed on the counter-shaft connected by a chain with a relatively large sprocket-wheel locked to rotate with the movable member of the third clutch, means for normally engaging the members of the third clutch, means for engaging the members of the first clutch while the members of the third clutch remain engaged, and means for engaging the members of the second clutch and disengaging the members of the third clutch.

The invention will be more fully described hereinafter, with reference to the accompanying drawings, in which—

Figure 1 is a horizontal sectional view, parts being shown in elevation; Fig. 2, a vertical sectional view on line 2 2, Fig. 1 and Fig. 3 a detail elevational view of a member of the third pair of clutches.

The same reference characters are used to designate the same parts in the several figures of the drawings.

Reference character A indicates a driving-shaft—such, for instance, as the crank-shaft of an automobile.

B indicates a fly-wheel fixed upon the driving-shaft in any suitable manner—as, for instance, by a key $b$.

$c$ indicates a pinion fixed to the driving-shaft adjacent the hub $a$ of the fly-wheel.

D indicates a disk rotatively mounted upon the hub $a$ of the fly-wheel and serving as a carrier for a plurality of pinions $d$, journaled thereon in mesh with the pinion C. Disk D is provided with a single flange around its outer periphery, surrounding which is a clutch-band D'. Any suitable means may be provided for tightening the clutch-band around the flange of the carrying-disk D to lock the same against rotation—such, for instance, as shown in Fig. 2, in which a bell-crank lever $d'$ is secured to a rock-shaft $D^2$, the arms of the bell-crank lever being connected to the ends of the clutch-band.

E' indicates an internal gear-wheel, the teeth $e$ of which mesh with the pinions $d$, carried by the disk D. The internal gear E' is mounted to rotate upon the driving-shaft and is rigidly connected to a sprocket-wheel F' and to a member G' of a clutch. Any suitable means may be provided for locking the internal gear, the sprocket-wheel, and clutch member to rotate together—such, for instance as rods $f$, extending through alined holes in the united elements. A bushing $n$ surrounds the driving-shaft and is interposed between the same and the united internal gear, sprocket-wheel, and clutch member.

H' indicates a clutch member coöperating with the member G' and fixed to rotate with the driving-shaft A. The engagement between the two members of the clutch is effected by two series of friction-disks K', one series having notches engaging splines $g'$ on the interior of a flange around the periphery of the member G', while the other series is provided with notches engaging splines $h'$ around the hub of the other clutch member H'. The friction-plates on each series alternate with those of the other and when forced into frictional engagement lock the two members of the clutch together. The means I employ for forcing the two series of friction-plates into engagement consists of a disk M', surrounding the driving-shaft and carrying laterally-projecting pins $m'$, which project through holes in the clutch member H' and bear at their ends upon the outer friction-plate. A similar pair of clutch members is also mounted upon the driving-shaft, comprising the member $H^2$, fixed to rotate with the shaft, and a coöperating member $G^2$, loosely mounted upon the shaft. Friction-plates $K^2$ are interposed between the splines of this second pair of clutch members $G^2$ and $H^2$, which are constructed in all respects similar to those above described in connection with the first pair of clutch members.

$M^2$ indicates a disk surrounding the driving-shaft, carrying laterally-projecting pins $m^2$, extending through holes in the member $H^2$ and bearing at their ends against the outer friction-plate of the series $K^2$.

Locked to rotate with the clutch member $G^2$ is a driving element, which may conveniently consist in a sprocket-wheel $F^2$. A member $E^2$ of a third clutch is locked to rotate with the driving element and also with the clutch member $G^2$ by any suitable means—such, for instance, as rods $f^2$, extending through alined holes in the united parts. A bushing $n^3$ is preferably interposed between the driving-shaft and the united elements rotatively mounted thereon.

O indicates the coöperating member of the third clutch, which is mounted to rotate upon a bushing $n$, secured to the driving-shaft, and is provided with laterally-projecting-pins $o$, adapted to be projected through slots $e^2$ in the member $E^2$. Loosely surrounding the bushing $n$ and intermediate of the members O and $E^2$ of the third clutch is a large sprocket-wheel N, through holes in which the pins $o$ pass. The sprocket-wheel N is prevented from moving axially upon the driving-shaft by means of the flange on the bushings $n$ and disk $E^2$ on the opposite sides thereof.

A' indicates a counter-shaft journaled in suitable bearings $a'$ $a'$ and having fixed thereon a large sprocket-wheel R', connected by a sprocket-chain $r'$ with the sprocket-wheel F'. A relatively small sprocket-wheel $R^2$ is also fixed upon the counter-shaft and is connected by a sprocket-chain $r^2$ with the relatively large sprocket-wheel N.

The clutch members of the third clutch are normally retained in engagement by means of a bell-crank lever P, one end of which is provided with a yoke extending into a peripheral groove on the clutch member O. A spring P', connected at one end to a lug $p$, projecting from the bell-crank lever, and at its other end to a stationary bracket $p'$, tends to retain the member O in position for the pins $o$ thereon to project through the grooves $e^2$ in the member $E^2$. The opposite end of the bell-crank lever D is provided with an antifriction-roller $p^2$, adapted to be engaged by a cam $a^2$, fixed upon a shaft $A^2$. The shaft $A^2$ is journaled in suitable bearings—such, for instance, as the outer end of the bracket $P^3$, projecting from the bar $p^3$ of the driving-shaft. The opposite end of the shaft $A^2$ may be journaled in a bracket $L^3$, supported in any suitable manner.

Any suitable means is provided for forcing into locked engagement the members of either the first clutch or of the second clutch, such means being shown as consisting of a block K, mounted to slide axially upon the driving-shaft and having radially-projecting pins $k$. A yoke L surrounds the block K and is provided with inclined slots $l$ $l$, through which the pins $k$ $k$ on the block extend. One end L' of the yoke is in sliding engagement with a suitable support $l'$, while the opposite end $L^2$ of the yoke is adapted to reciprocate through a bearing $l^2$, carried by the bracket $L^3$. The end of the portion $L^2$ of the yoke is provided with a laterally-projecting pin $l^3$, engaging a notch in the upper end of a crank-arm $A^3$, projecting from the rock-shaft $A^2$. The opposite vertical surfaces of the block K are provided with annular grooves within which are ball-bearings $k'$, the balls being retained within the grooves in the block by plates, such as K', through holes in which the balls project.

G in Fig. 1 indicates a brake-band surrounding the peripheral flange on the clutch member $G^2$, suitable operating means (not shown) being provided for causing the brake-band to tightly grip the flange on the clutch member to retard the rotation of the driving element $F^2$.

The operation of my invention is as follows: When it is desired to convert the rotary movement of the driving-shaft A into a reverse rotary movement applied to the driving element $F^2$, the parts are in the position shown in Fig. 1, in which the clutch-band $D'$ has been tightened to lock the carrier D against rotation. The rotation of the driving-shaft is communicated through the pinion C to the pinions $d$, which in turn rotate the internal gear-wheel $E'$ in a reverse direction to the rotation of the driving-shaft. The sprocket-wheel $F'$ rotates with the internal gear $E'$ and through the sprocket-chain $r'$ and large sprocket-wheel $R'$ rotates the counter-shaft $A'$. The rotation of the counter-shaft is communicated by the sprocket-wheel $R^2$, sprocket-chain $r^2$, sprocket-wheel N, and clutch member $E^2$ to the driving element $F^2$, thereby rotating such element in a reverse direction at reduced speed. In order that the driving element may be rotated in the same direction as the driving-shaft, but at reduced speed, the clutch-band $D'$ is of course released and the yoke L moved downwardly in Fig. 1 or toward the left in Fig. 2, thereby forcing the block K into contact with the disk $M'$ and causing the pins $m'$ carried thereby to press the alternate series of friction-plates $K'$ into frictional engagement with each other, thereby locking the members $H'$ and $G'$ of the first clutch together, so that the sprocket-wheel $F'$ rotates with the driving-shaft. The rotary motion of the sprocket-wheel $F'$ is transmitted to the driven element $F^2$ through the counter-shaft, sprocket-wheels thereon, and connecting-chains, the sprocket N being locked to the driven element by the members O and $E^2$ of the third clutch. It is obvious that the speed of rotation of the driven element is less than that of the driving-shaft, owing to the sprocket-wheel $R'$ being larger than the sprocket-wheel $F'$, while sprocket-wheel $R^2$ is smaller than the sprocket-wheels $R'$ and N. When the driven element is to be rotated at high speed, the yoke L is moved toward the right in Fig. 2 by oscillating the lever $A^4$, rigidly attached to the rock-shaft $A^2$, so that the block K will be forced against the disk $M^2$ and the pins $m^2$ carried thereby pressed against the friction-plates $K^2$, so as to lock the members $H^2$ and $G^2$ of the second clutch together. This oscillation of the shaft $A^2$ causes the cam $a^2$ carried thereby to oscillate the bell-crank-lever P through engagement with the antifriction-roller $p^2$ carried thereby. The oscillation of the bell-crank lever moves the member O of the third clutch away from the sprocket-wheel N, thereby withdrawing the pins $o$ from the slots in the clutch member $E^2$, so that the driven element is disconnected from the shaft. This disconnection is intended to take place before the locking of a second pair of clutch members $H^2$ and $G^2$. It is evident that in the above operation the driven element is locked to rotate with the driving-shaft through the medium of the engaged clutch members $H^2$ and $G^2$, the former of which is fixed to the driven element. When the yoke L is moved to the intermediate position shown in Fig. 1, the block through the engagement of the pins $k$ thereon with the inclined slots $l$ in the yoke is moved out of engagement with the disk $M^2$, and coincidently the rock-shaft $A^2$ is oscillated, so as to move the cam $a^2$ out of engagement with the end of the bell-crank lever, so that the latter is oscillated by the spring $P'$ and the clutch member O moved toward the sprocket-wheel N and the pins $o$ carried thereby projected into the slots $e^2$ of the coöperating clutch member.

From the foregoing description it will be observed that I have invented an improved transmission-gearing in which the driven element may be directly connected to the rotating power-shaft, in which the driven element may also be connected to the power-shaft through interposed speed-reducing gearing, and in which the driven element may be driven in a reverse direction to that of the rotating shaft, such different movements of the driven element being easily effected by the means of a comparatively simple mechanical structure.

I claim—

1. In a transmission mechanism, the combination with a driving-shaft, of a pinion fixed thereon, an internal gear loosely mounted on said shaft, a pinion-carrier also loosely mounted on said shaft, one or more pinions journaled on said carrier in mesh with said pinion and internal gear, means for locking said carrier against rotation, a counter-shaft, means for rotating said counter-shaft from said internal gear, a driven element, and means for imparting the reverse rotary motion of said counter-shaft to the driven element.

2. In a transmission mechanism, the combination with a driving-shaft, of a pinion fixed thereon, an internal gear loosely mounted on said shaft, a pinion-carrier also loosely mounted on said shaft, one or more pinions journaled on said carrier in mesh with said pinion and internal gear, a pair of clutch members mounted upon said shaft, one member rigidly connected to said internal gear and the other member connected to rotate with said shaft, means for locking said carrier against rotation, means for engaging and disengaging the members of said clutch, a gear-wheel interposed between and rigidly united to said internal gear and the clutch member loose on said shaft, a counter-shaft, speed-reducing mechanism between said last-mentioned gear and said counter-shaft, a driven element, and speed-reducing mechanism between said counter-shaft and the driven element.

3. In a transmission mechanism, the combination with a driving-shaft, of a pinion fixed thereon, an internal gear-wheel loosely mounted on said shaft, a pinion-carrier also loosely mounted on said shaft, one or more pinions journaled on said carrier in mesh with said pinion and internal gear, means for locking said carrier against rotation, a driven element loosely mounted on the driving-shaft, speed-reducing mechanism interposed between said internal gear and said driven element, means for disconnecting said driven element from said speed-reducing mechanism, and means for locking said driven element directly to the driving-shaft.

4. In a transmission mechanism, the combination with a driving-shaft, of a pinion fixed thereon, an internal gear-wheel loosely mounted on said shaft, a pinion-carrier also loosely mounted on said shaft, one or more pinions journaled on said carrier in mesh with said pinion and internal gear, means for locking said carrier against rotation, a pair of clutch members mounted upon said shaft, one member rigidly connected to said internal gear and the other member connected to said shaft to rotate therewith, means for engaging and disengaging the members of said clutch, a driven element loosely mounted on the driving-shaft, speed-reducing mechanism interposed between said internal gear and said driven element, means for disconnecting said driven element from said speed-reducing mechanism, and means for locking said driven element directly to the driving-shaft.

5. In a transmission mechanism, the combination with a driving-shaft, of a pinion fixed thereon, an internal gear loosely surrounding said shaft, a pinion-carrier also loosely surrounding said shaft, one or more pinions journaled on said carrier in mesh with said pinion and internal gear, a pair of clutch members mounted upon said shaft, one member rigidly connected to said internal gear and the other member connected to rotate with said shaft, means for locking said carrier against rotation, means for engaging and disengaging the members of said clutch, a gear-wheel rigidly united to said internal gear and the clutch member loose on said shaft, a counter-shaft, speed-reducing mechanism between said last-mentioned gear and said counter-shaft, a driven element, and means for transmitting rotary motion from said counter-shaft to said driven element.

In testimony whereof I sign this specification in the presence of two witnesses.

J. O. HOBBS.

Witnesses:
GEO. L. WILKINSON,
C. A. MULLEN.